(No Model.)
M. P. BRISCOE.
REIN HOLDER.
No. 263,107. Patented Aug. 22, 1882.
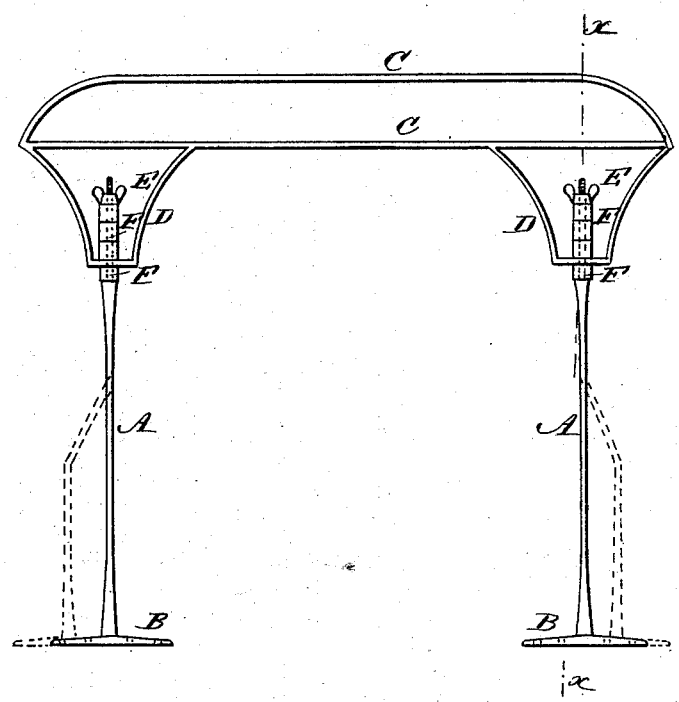
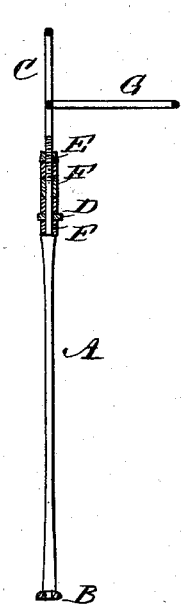
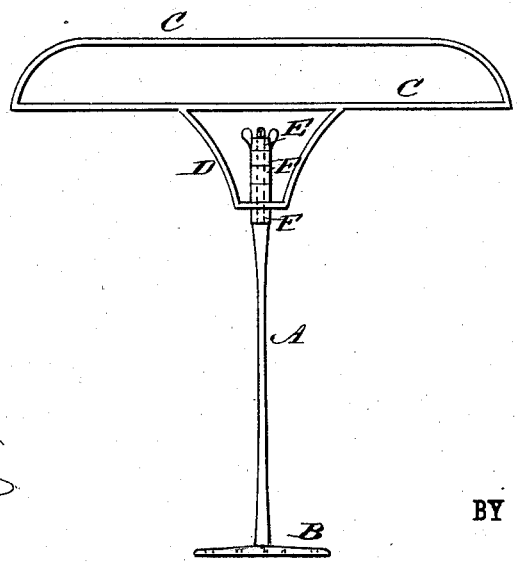
WITNESSES:
C. Neveux
C. Sedgwick
INVENTOR:
M. P. Briscoe
BY Munn & Co
ATTORNEYS.

UNITED STATES PATENT OFFICE.

MADISON P. BRISCOE, OF BAIRDSTOWN, GEORGIA.

REIN-HOLDER.

SPECIFICATION forming part of Letters Patent No. 263,107, dated August 22, 1882.

Application filed June 16, 1882. (No model.)

*To all whom it may concern:*

Be it known that I, MADISON P. BRISCOE, of Bairdstown, in the county of Oglethorpe and State of Georgia, have invented certain new and useful Improvements in Rein-Holders, of which the following is a full, clear, and exact description.

Reference is to be had to the accompanying drawings, forming part of this specification, in which similar letters of reference indicate corresponding parts in all the figures.

Figure 1 is rear elevation of my improvement. Fig. 2 is a sectional end elevation taken through the line $x$ $x$, Fig. 1, and showing a kicking attachment secured thereto. Fig. 3 is a rear elevation of a modified form of the same.

The object of this invention is to prevent a horse from clamping the driving-reins against his hips with his tail, and thus preventing the driver from having a proper control over the reins.

The invention consists in a rein-holder constructed with an upright frame secured to one or more upright rods by a hand-nut, the said rods having cross heads or feet upon their lower ends for attachment to the tongue or shafts of a vehicle. The upper ends of the rods are provided with washers to allow the height of the frame to be regulated according to the height of the horse. Upon the upright frame is formed a horizontal frame to allow the upright frame to be moved forward over the hips of the horse, so that the horse cannot kick without raising the forward part of the vehicle, as will be hereinafter fully described.

A represents two iron rods, which may be made straight, as shown in Figs. 2 and 3, and in full lines in Fig. 1, or may be bent, as shown in dotted lines in Fig, 1, so as to bring their lower ends farther apart than their upper ends. Upon the lower ends of the rods A are formed cross heads or feet B, the arms of which are perforated to receive the screws that fasten the said cross-heads to the shafts or tongue of a vehicle.

C is a frame, also made of iron rods, and which has downwardly-projecting arms or brackets D upon its ends. In the lower ends of the arms D are formed holes to receive the upper ends of the rods A.

The rods A have screw-threads cut upon their upper ends to receive the hand-nut E. Upon the upper ends of the rods A are placed tubular washers F, which may be placed between the nuts E and the bases of the brackets D, or below the bases of the said brackets, or partly above and partly below the bases of the brackets, to adjust the position of the frame C, as the height of the horse may require.

When the holder is to be used upon a one-horse vehicle, two upright rods A are used, as hereinbefore described; but when the holder is to be applied to a two-horse vehicle, only one rod A is used, as shown in Fig. 3.

When the holder is to be used with a kicking horse, a horizontal frame, G, is attached to or formed upon the lower bar of the frame C, as shown in Fig. 2.

The holder is usually attached to the shafts or tongue a little in front of the whiffletree or double-tree; but when the horizontal frame G is used, the holder is moved forward so as to bring the upright frame C over the hips of the horse, so that when the horse kicks his hips will come in contact with the frame C, and he will have to raise the entire forward part of the vehicle before he can kick so as to do any damage.

In using the rein-holder the reins are passed through the space between the upper and lower bars of the frame C, so that they cannot be drawn down upon the horse's hips or knocked out of place by the switching of the horse's tail.

Having thus fully described my invention, I claim as new and desire to secure by Letters Patent—

The herein-described rein-holder and kicking attachment, consisting of the upright rods A, the frame C, adjustably secured thereto, and the horizontal frame G, secured to the lower bar of the frame C C, substantially as set forth.

M. P. BRISCOE.

Witnesses:
  JOSEPH DAVISON,
  J. L. GUILL.